United States Patent Office 3,456,760
Patented July 22, 1969

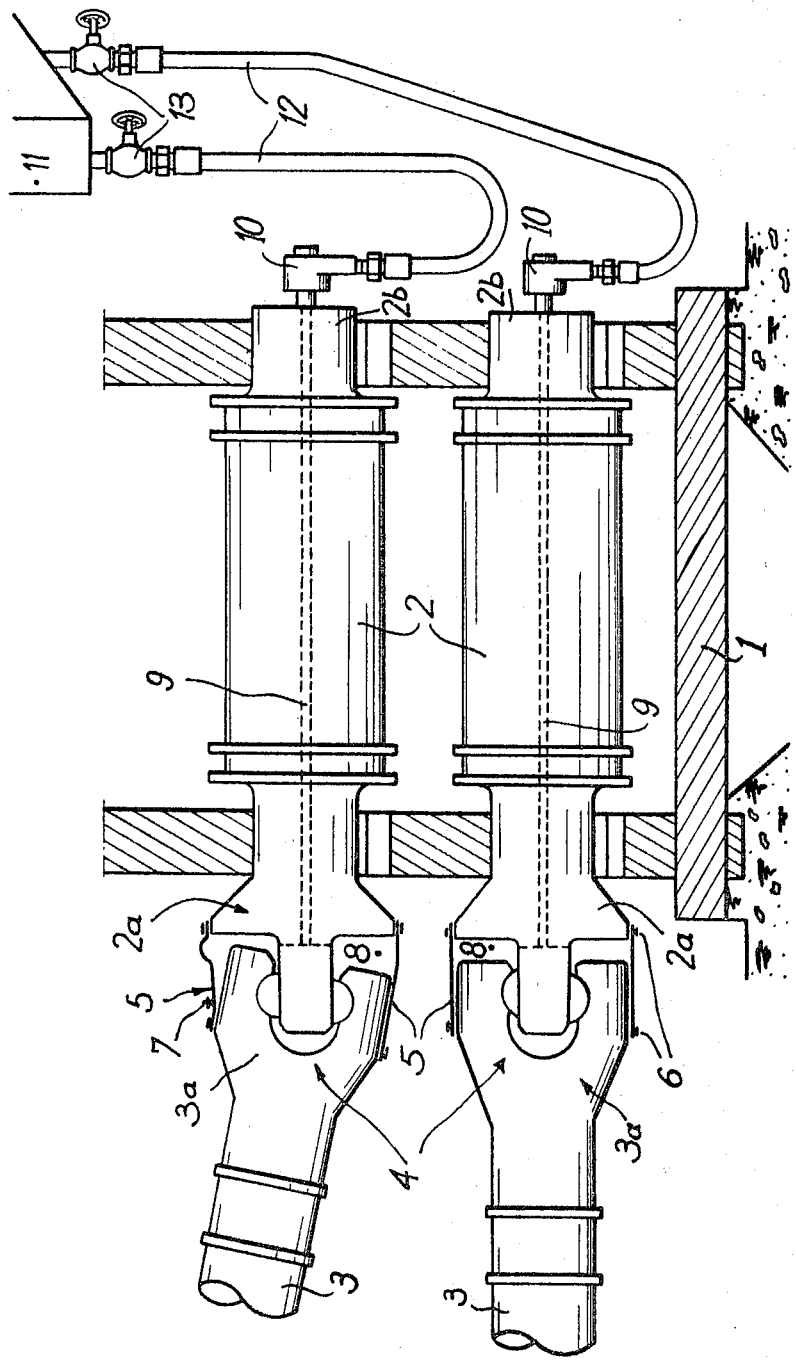

3,456,760
LUBRICATING DEVICE FOR ROLLING MILLS
Jean-Pierre Musse and André Allard, Thionville, France, assignors to Societe Anonyme: Societe Lorraine de Laminage Coutinu, Paris, France, a French company
Filed Feb. 14, 1967, Ser. No. 616,110
Claims priority, application France, Mar. 3, 1966, 51,905
Int. Cl. F16n *17/06, 29/00*
U.S. Cl. 184—6                                    3 Claims

ABSTRACT OF THE DISCLOSURE

A continuous lubrication device for a rolling mill installation having a swivel-joint at one side of a mill housing connecting one end of one of the rolling cylinders to an extension from the driving device for the cylinder. The lubrication device includes a sealed deformable lubricating chamber surrounding the swivel-joint, and oil feed duct bored in the cylinder along the axis of rotation thereof and leading at one end into the lubricating chamber, and a lubricant reservoir connected in a fluid-tight manner to the other end of the duct.

---

The present invention relates to a lubricating device for swivel-joint connecting the cylinders of a rolling -mill with extension of the driving means for such cylinders.

Known lubricating devices for such swivel-joints are subject to disadvantages with regard to the unequal nature of lubrication which they provide at different points of the joint, and also with regard to the time intervals separating two successive lubricating operations. Moreover, the discontinuous nature of these types of lubrication necessitate frequent stoppages of the machinery of the rolling mill installation, so that the lubrication of the swivel-joints may be carried out.

An object of the invention is to improve the quality of this lubrication at all points of the swivel-joints and at each instant, whilst avoiding stopping the machines for this purpose, by providing a device such that the swivel-joint is permanently immersed in a continuously fed bath of lubricant.

To this effect, there is provided a device for lubricating by a lubricating bath a swivel-joint disposed to one side of a rolling mill housing and connecting one of the ends of a rolling-cylinder to an extension of the drive for this cylinder, the device being characterized, according to the invention, by the combination of a sealed deformable lubrication chamber surrounding the said swivel-joint, a feed duct provided in the rolling cylinder, bored along the axis of the cylinder and leading into one end of the lubricating chamber, and a lubricant reservoir connected in fluid-tight manner to the other end of the feed duct.

In one embodiment of the invention, the lateral wall of the deformable sealed lubricating chamber is constituted by a flexible impermeable sleeve surrounding the swivel-joint and clamped in fluid-tight manner on the one hand of the end of the extension, and on the other hand on the corresponding end of the rolling cylinder.

In one embodiment of lubricant reservoir, the latter is fixed with its lower part situated higher than the lubricating chamber and being connected at the other end of the feed duct by means of a flexible pipe and a rotatable joint connection.

In order that the invention and its advantages may be fully understood, an embodiment in accordance therewith will now be described, by way of example, with reference to the accompanying drawing of which the single figure represents schematically and in partial section a rolling installation equipped with the device of the invention.

A rolling mill housing 1 is equipped with two rolling-cylinders 2 whose extremities 2a, disposed to one side of the housing 1, are each connected to an extension of rotary driving means 3 by a swivel-joint 4.

In the embodiment described of a lubricating device in accordance with the invention, this swivel-joint 4 is enclosed by a flexible impermeable sleeve 5 clamped in fluid-tight manner at its two extremities respectively to the head 3a of the extension 3 and to the end 2a of the rolling cylinder 2; this clamping is effected by means of two collars 6. The sleeve 5 is equipped with a bleed-nozzle 7, and the space defined by the sleeve 5, the end 2a of the rolling cylinder 2, and the top of the head of the extension 3a form a sealed chamber 8 in which moves the swivel-joint 4.

Into this chamber 8 leads a cylindrical feed duct 9, bored through the rolling cylinder 2 along the axis of the latter; at the end 2b of this cylinder 2 opposite the swivel-joint 4 with respect to the cage 1, a rotatable joint 10 is fixed to the mouth of the feed duct 9.

Finally, a fixed reservoir 11 containing a lubricant such as oil is connected at its lower portion to the other end of the rotatable joint connection 10 by means of a flexible pipe 12 and a stop-cock 13. The oil reservoir 11, which has a capacity of about 10 litres is placed at such a height as to permit it to completely feed by gravity the two chambers 8 with oil and to ensure compensation for oil losses due to possible leaks in the circuits 12, 10, 9 and 8; to this effect, it can be placed above the housing 1. A liquid level detector, not shown, can be disposed on the lubricant reservoir 11, in order to indicate troubles which are likely to occur in the lubrication circuit.

The manner of operation of this lubricating device is the following: before the rolling-cylinder 2 is installed in the housing 1, the flexible sleeve 5 is pushed over the head of the extension 3a and pushed as far as possible towards the extension 3 at the side of the driving motor which is not shown. Then, having placed in position the cylinder 2 in the housing 1, the flexible sleeve is slid towards the housing 1 until it surrounds the swivel-joint 4, care being taken that the bleed nozzle 7 is placed in the upper portion of the sleeve 5.

The ends of the sleeve 5 are then gripped by the two collars 6, around the head of the extension 3a and around the end 2a of the cylinder 2 in such a way as to render the chamber 8 fluid-tight.

The lubricating device being thus in place, the stop cock 13 of the reservoir 11 is opened to feed the chamber 8 with oil through the feed duct 9; the bleed nozzle 7 allows the air contained in the ducts 9 and the chamber 8 to be evacuated.

The motor of the installation can then be started, the oil fed from the reservoir 11 ensuring that the chamber 8 is permanently full of oil by compensating the oil losses due to possible leaks.

Thus constructed, the device of the invention offers all the advantages of a continuous lubrication system, whilst providing the same quality of lubrication at each instant, and above all obviating the stoppages of the rolling installation in order to effect lubrication; in effect, the oil reservoir 11 being fixed, it is possible to re-fill it while the machine is running, and the aforesaid oil level indicator in the reservoir 11 guarantees the security of lubrication of the swivel-joint 4. Moreover, this lubricating device offers the advantages of oil-bath lubrication, that is to say, lubrication of the same quality at each point of the swivel-joint.

Such a device, conceived according to the principles of the invention, can be made so as to provide a minimum encumbrance around the turning parts, whatever may be the atmosphere surrounding the swivel-joint 4, which could be dust, steam or water jets.

Of course, embodiments other than those described can be made without departing from the scope of the invention.

What we claim is:

1. In a rolling mill installation a continuous lubrication device for lubricating a rotating swivel-joint at one side of the mill housing connecting one end of one of the rolling-cylinders to an extension from the driving means for said cylinder, said device comprising in combination a sealed deformable lubricating chamber surrounding said swivel-joint, an oil feed duct bored in said cylinder coaxial with the axis of rotation of said cylinder and leading at one end into the lubricating chamber, and a lubricant reservoir connected in fluid-tight manner to the other end of said duct for continuously feeding lubricant to the swivel-joint while the cylinder is continuously being rotated.

2. A device according to claim 1 wherein the lateral wall of the lubricating chamber is constituted by a flexible impermeable sleeve surrounding the swivel-joint and gripped, in fluid-tight manner, on the head of said driving means extension, and on the corresponding end of the rolling-cylinder.

3. A device according to claim 1 wherein the lubricant reservoir is fixed with its lower portion disposed at a higher level than the lubricating chamber, at least one flexible tube being connected at one end to the reservoir and at its other end, through a rotatable connection, to the free end of said oil feed duct in a rolling-cylinder.

References Cited

UNITED STATES PATENTS

| | | | |
|---|---|---|---|
| 2,788,861 | 4/1957 | Wutscher | 184—6 |
| 2,914,932 | 12/1959 | Emrick | 64—7 X |
| 3,042,148 | 7/1962 | Kempf | 184—6 |

FOREIGN PATENTS

| | | |
|---|---|---|
| 902,337 | 1/1954 | Germany. |
| 919,532 | 2/1963 | Great Britain. |

HOUSTON S. BELL, JR., Primary Examiner

U.S. CL. X.R.

64—7